United States Patent [19]

Hamacher

[11] 4,312,028

[45] Jan. 19, 1982

[54] SHOCKPROOF FLUORESCENT LIGHT FIXTURE

[76] Inventor: Martin Hamacher, Westerholterstr. 791, 4352 Herten/Westf., Fed. Rep. of Germany

[21] Appl. No.: 84,194

[22] Filed: Oct. 12, 1979

[30] Foreign Application Priority Data

Oct. 18, 1978 [DE] Fed. Rep. of Germany ... 7831005[U]

[51] Int. Cl.³ .................... B60Q 1/00

[52] U.S. Cl. .................... 362/369; 362/217; 362/306; 362/390

[58] Field of Search .............. 362/217, 225, 306, 369, 362/390

[56] References Cited

U.S. PATENT DOCUMENTS

| | | | |
|---|---|---|---|
| 3,788,560 | 1/1974 | Hough et al. | 362/217 |
| 4,092,706 | 5/1978 | Vest | 362/390 |
| 4,112,485 | 9/1978 | Sutter | 362/369 |
| 4,128,865 | 12/1978 | Johnson | 362/369 |
| 4,171,499 | 10/1979 | Scherzer | 362/390 X |

FOREIGN PATENT DOCUMENTS

| | | | |
|---|---|---|---|
| 1132642 | 9/1955 | France | 362/390 |

*Primary Examiner*—Peter A. Nelson
*Attorney, Agent, or Firm*—Karl F. Ross

[57] ABSTRACT

A light fixture has a support formed with a recess having an inner wall. An at least partially transparent lens covers the recess. A fluorescent tube in this recess is surrounded by a transparent and elastomeric cushion sleeve that is in turn covered by a rigid and transparent jacket, both made of synthetic-resin material. Elastomeric holding blocks are engaged between the jacket and the inner wall of the recess so as to support the tube via the cushion sleeve and the jacket in the recess of the housing. Thus the tube is effectively protected against shocks of large and small amplitude over a wide frequency range.

8 Claims, 1 Drawing Figure

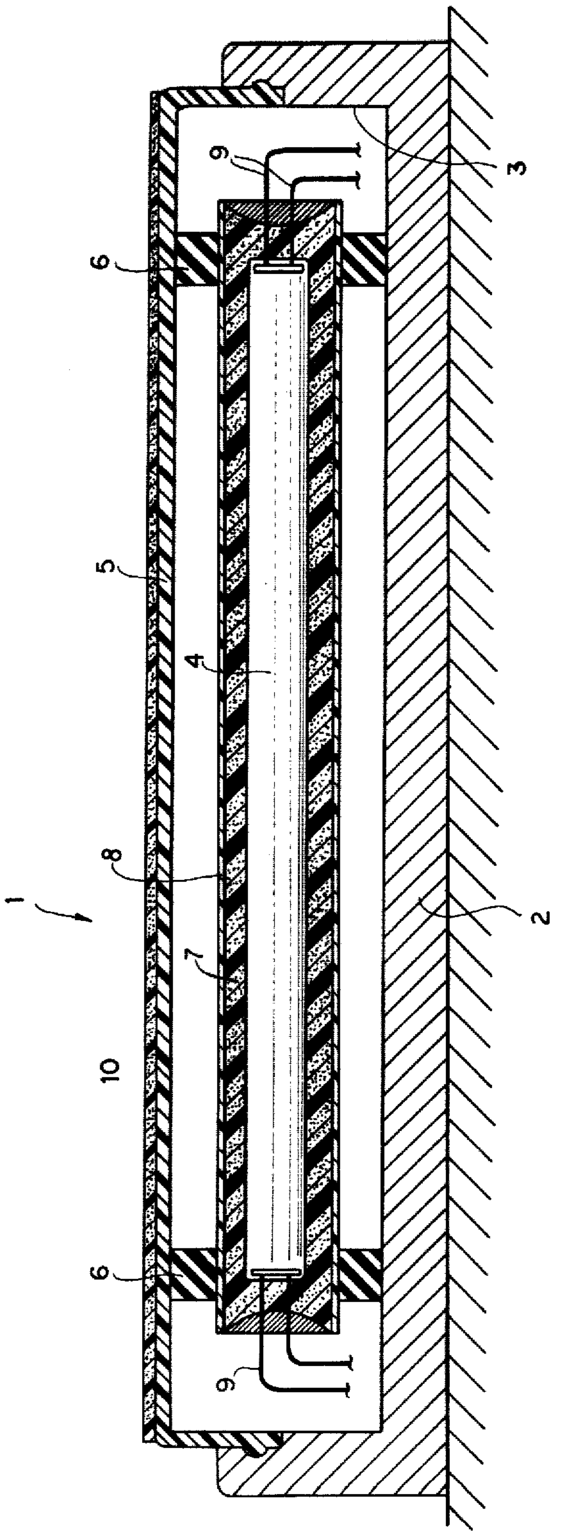
1
2
3
4
5
6
6
7
8
9
9
10

SHOCKPROOF FLUORESCENT LIGHT FIXTURE

FIELD OF THE INVENTION

The present invention relates to a light fixture. More particularly this invention concerns a shockproof fluorescent light fixture intended for use in situations where the fixture is subjected to considerable mechanical shock and the like.

BACKGROUND OF THE INVENTION

Fluorescent light fixtures, popular for their long life, low energy consumption, and high light output, are frequently used in situations where they are subjected to considerable mechanical shocks. As the fluorescent tube, which is the essential light-emitting element for such a fixture, is invariably made of glass and is normally of elongated cylindrical shape, protection of it presents more problems than protection of a simple glass-bulb envelope for an incandescent lamp fixture.

It is therefore known from German Pat. publication No. 1,589,330 to mount the fluorescent tube by means of elastomeric holding blocks in the recess of a fixture housing. This recess is then covered with a transparent lens which may be constituted as a diffuser. Such an arrangement is extremely effective in protecting the tube itself from being directly impacted from outside, and even from shocks which will be transmitted through the housing of the fixture to the bulb. Nonetheless it is still possible for shock waves transmitted through the air to be effective on the fluorescent tube and, in extreme situations, to break this tube. It is, in fact, even possible for the tube to be damaged beyond use without the light fixture housing or its lamp being damaged whatsoever. It has also been suggested in German Pat. publication No. 2,529,286 to dispense entirely with a light-fixture housing, and to simply mount the tube itself in a protective sleeve. The sleeve can in fact be formed as an elastomeric mass covered with a dense skin, all of course of transparent material. Such an arrangement has proven relative effective in protecting the tube against low-amplitude shocks, but is almost completely ineffective when the fixture is struck a substantial blow.

OBJECTS OF THE INVENTION

It is therefore an object of the present invention to provide an improved light fixture.

Another object is to provide a fluorescent-type light fixture wherein the light-emitting element-- the fluorescent tube -- is protected against low-amplitude shocks, such as sonic-range compression waves, and high-amplitude mechanical shocks, such as simple jolting of the fixture.

SUMMARY OF THE INVENTION

These objects are attained according to the instant invention in a light fixture wherein the fluorescent tube is received in a transparent and elastomeric cushion sleeve that surrounds it and is in turn surrounded by a rigid transparent jacket. The jacket is in turn supported by means of several elastomeric holding blocks that engage the inner wall of a recess of a support for the light fixture. An at least partially transparent lens or diffuser covers this recess. Thus the delicate fluorescent tube is doubly protected, against mechanical jolting of the entire fixture and against air-transmitted compression waves. Mechanical vibrations transmitted directly to the housing must in turn be transmitted through the elastomeric mounting blocks and the elastomeric sleeve to the tube, so that little motion transmission between the housing and the tube for this type of mechanical shock is likely. Air-transmitted compression waves are, however, almost wholly absorbed or cancelled out by the elastomeric sleeve, although some of the force of these waves is reflected by the lens. Even if this lens is destroyed, the tube remains relatively well protected, unlike prior-art systems wherein any object that hit the lens and broke it was also certain to destroy the underlying fluorescent tube. It is possible according to this invention to provide the outside surface of the lens with a transparent elastomeric covering to further protect the tube.

According to particular features of this invention the jacket is formed of a thermosetting resin such as a polycarbonate, a polyepoxy, or polymethylmethacrylate. Of particular use is the polycarbonate sold under the tradename MAKROLON. This jacket is, according to the invention, reinforced with glass fibers.

The sleeve according to further features of this invention is preferably formed of a soft synthetic-resin foam, preferably a silicone rubber. Such a sleeve not only is good protection against mechanical vibrations, but is a good electrical insulator and also serves to protect the tube against water and dust. What is more it is relatively easy to form a sleeve of such material directly around the tube by casting or injection molding.

According to another feature of this invention the elastomeric material forming the sleeve is substantially stiffer than that forming the mounting blocks. Thus high-amplitude displacements will be absorbed almost entirely by the relatively soft mounting blocks, whereas low-amplitude and higher-frequency vibrations will be absorbed by the elastomeric sleeve as the housing recess normally has its own resonant frequency. It is a feature of this invention to particularly tune the resonant frequencies of the materials making up the sleeve and mounting blocks to cancel out vibrations in this range, that is to make them decay.

Brief Description of the Drawing

The sole FIGURE of the drawing is an axial section through a light fixture according to this invention.

SPECIFIC DESCRIPTION

As seen in the drawing a light fixture 1 according to the instant invention has a housing 2 formed with an elongated recess 3 in which is provided a conventional fluorescent tube 4 which may be of the rapid-start type. The recess 3 is covered by a synthetic-resin transparent lens 5 having a transparent foam covering 10, and a pair of annular holding blocks 6 serves to support the tube 4 in the recess 3.

According to this invention the tube 4 is surrounded on all sides by an elastomeric cushion sleeve 7 of silicone rubber. This sleeve 7 is in turn surrounded by a rigid synthetic-resin jacket 8 of a polycarbonate such as MAKROLON.

The sleeve 7 is cast directly around the tube 4, with the leads 9 for electrically connecting the tube 4 extending out through this sleeve 7. The polycarbonate jacket 8 is then cast around the sleeve 7. The two elastomeric rings or blocks 6 are then fitted over the ends of the assembly 4, 7 and 8 which is then fitted inside the recess 3. Snapping of the cover 5 placed over the recess 3 encloses it and holds the entire assembly firmly together.

I claim:

1. A light fixture comprising:

a support formed with a recess having an inner wall;

an at least partially transparent lens covering said recess;

a fluorescent tube in said recess;

a transparent and elastomeric cushion sleeve surrounding said tube;

a rigid transparent jacket surrounding said cushion sleeve and spaced inwardly of said inner wall; and at least one elastomeric holding block engaging inwardly against said jacket and outwardly against said inner wall and supporting said tube via said cushion sleeve and said jacket in said recess.

2. The fixture defined in claim 1 wherein said sleeve and jacket are of synthetic-resin material.

3. The fixture defined in claim 2 said jacket is glass-fiber reinforced.

4. The fixture defined in claim 3 wherein said cushion sleeve is made of soft synthetic-resin foam.

5. The fixture defined in claim 4 wherein said foam is a silicone foam.

6. The fixture defined in claim 3 wherein said sleeve is of substantially stiffer material than said blocks.

7. The fixture defined in claim 3 wherein two such blocks spaced along said jacket encircle said jacket and are braced against said inner wall.

8. The fixture defined in claim 1 wherein the space between said rigid jacket and said inner wall and lens is substantially empty except for said holding block.

* * * * *